May 11, 1926. 1,584,634

M. B. MONTAGUE

OIL RETAINING AND DISPENSING RECEPTACLE FOR THE MAKING OF MAYONNAISE

Filed Oct. 15, 1924

Inventor
Mary B. Montague
Attorney,

Patented May 11, 1926.

1,584,634

UNITED STATES PATENT OFFICE.

MARY B. MONTAGUE, OF SALEM, OREGON.

OIL RETAINING AND DISPENSING RECEPTACLE FOR THE MAKING OF MAYONNAISE.

Application filed October 15, 1924. Serial No. 743,760.

My invention is intended for use by the housewife and others who are accustomed to the making of mayonnaise, and consists primarily of a retaining receptacle supported on legs and adapted to having an outlet upon the dispensing side consisting of a suitable controlling cock and having a top closure that is adapted to close and tight fitting and one that will permit the free flow of the contents while being used. Further novelty resides in the fine appearance, the simple construction, and the ease of operation afforded in the construction of my device.

The invention consists in the combination and arrangement of parts whereby the above objects and certain other objects hereinafter appearing are attained, as set forth in the following specification and particularly pointed out in the appended claims.

I attain these objects by the mechanism illustrated in the accompanying drawings, in which—

Like reference characters refer to like parts throughout the several views—

Figure 1:
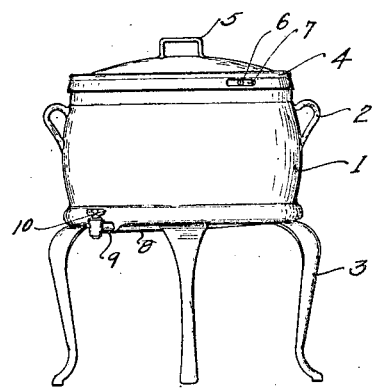
Fig. 1 is a perspective, front elevation of my assembled device.
Figure 2:
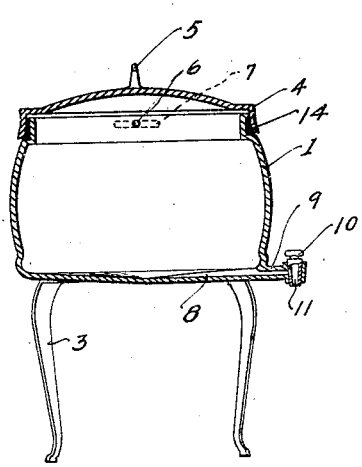
Fig. 2 is a sectional view of the same.
Figure 3:
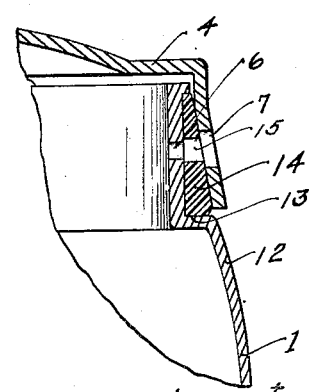
Fig. 3 is a detached, sectional view of the closure and the body of the receptacle made to illustrate the construction of the same.

The main bowl body of my retaining and dispensing receptacle is shown at 1 having a handle member 2 on either side of the same and leg supports 3 thereunder. A closure 4 is provided having a suitable handle or bail 5 at the top of the same. In the making of mayonnaise it is first desirable that a limited flow of the oil material should be first used and that the flow should be permitted to increase as the work of making progresses, this makes the necessity for an air vent being provided through the bowl or top structure into the bowl proper, this I have accomplished by the making of a vent hole 6 through the bowl and a slot 7 through the wall of the closure to register with the hole through the wall of the bowl. A depression 8 is formed transversely of the bottom and having a connecting out bound pipe 9 connected therewith terminating in a controlling cock 10 having an outlet 11 therethrough. To prevent the oily material to be retained within the receptacle from becoming rancid the container should be made of opaque material and should be retained in an air tight receptacle. To provide this I have found that the receptacle should be made of aluminum or other suitable material having a gasket made of suitable material to resist the destructive action of oils between the bowl and the closure. This is best accomplished by having a depression 13 within the upper confines of the outer wall of the bowl wall 12 and having the lower portion of the gasket slightly tapered, becoming larger at the base, or increasing in diameter at the base. The closure also has a slight taper, so that as the closure is pressed down the two sloping surfaces contact and a snugly fitting contact is made. An opening 15 is to be provided through the gasket and made to register with the opening through the wall of the bowl and the slot in the closure. When my device is not in use, the slot in the closure may be turned so that the openings do not register. The controlling cock being closed results in a practically air tight receptacle being formed and one wherein the destructive light rays do not have a decomposing effect upon the oily materials.

Having thus described my device I wish to make the following claims therefor:—

1. An oil retaining and dispensing receptacle for the making of mayonnaise, comprising a bowl adapted to be supported upon legs and having a transverse depression across the bottom, terminating in a pipe outlet having a controlling cock adapted to the outflow and control of oil therethrough, said bowl adapted to having a gasket fitted to the outer, upper periphery thereof, one, or more, inlets through the bowl wall and the gasket adapted to the passage of air therethrough, a top closure adapted to fit about the bowl and gasket having a slotted opening therethrough, said slotted opening adapted to register with the opening through the bowl wall.

2. An oil retaining and dispensing receptacle for the making of mayonnaise, comprising an opaque oil reservoir having a transverse depression across the bottom, a pipe connected with said depression and adapted to permit the flow of oil therethrough, a control cock for said pipe, a cover for said oil reservoir, an airtight gasket disposed between the oil reservoir, and the cover, slotted openings in the cover adapted to register with openings in the gasket and oil reservoir, said openings adapted to permit the passage of air therethrough, and leg supports adapted to maintain the oil reservoir in an elevated position.

MARY B. MONTAGUE.